(12) United States Patent
Aubin

(10) Patent No.: US 8,303,258 B2
(45) Date of Patent: Nov. 6, 2012

(54) FAN PLATFORM FIN

(75) Inventor: Stephan Aubin, Charenton le Pont (FR)

(73) Assignee: SNECMA, Paris (FR)

( * ) Notice: Subject to any disclaimer, the term of this patent is extended or adjusted under 35 U.S.C. 154(b) by 1403 days.

(21) Appl. No.: 11/869,180

(22) Filed: Oct. 9, 2007

(65) Prior Publication Data

US 2008/0095614 A1 Apr. 24, 2008

(30) Foreign Application Priority Data

Oct. 20, 2006 (FR) ...................................... 06 54393

(51) Int. Cl.
*F01D 5/14* (2006.01)
(52) U.S. Cl. .................................... 416/193 A; 416/203
(58) Field of Classification Search .............. 416/193 A, 416/203

See application file for complete search history.

(56) References Cited

FOREIGN PATENT DOCUMENTS

| DE | 2 135 286 | | 1/1973 |
|---|---|---|---|
| EP | 0 978 632 A1 | | 2/2000 |
| EP | 1 126 132 A2 | | 8/2001 |
| FR | 2.054.402 | | 4/1971 |
| FR | 2 432 608 | | 2/1980 |
| FR | 2432608 A | * | 4/1980 |
| FR | 2 485 620 | | 12/1981 |
| GB | 2 042 675 A | | 9/1980 |
| JP | 54151707 A | * | 11/1979 |

* cited by examiner

*Primary Examiner* — Justine Yu
*Assistant Examiner* — Jesse Prager
(74) *Attorney, Agent, or Firm* — Oblon, Spivak, McClelland, Maier & Neustadt, L.L.P.

(57) ABSTRACT

The invention relates to a fan platform of a bypass turbomachine having a primary stream and a secondary stream. The platform defines a portion of the surface of the nose around which the primary stream flows and that carries blades extending radially outwards from said platform. Between two adjacent blades, the platform has at least one rib projecting into the space between the two blades, said rib being designed to participate in compressing the primary air stream.

16 Claims, 3 Drawing Sheets

FAN PLATFORM FIN

The present invention relates to a fan platform for a bypass turbomachine having a primary stream and a secondary stream, the platform defining a portion of the surface of the nose about which the primary stream flows and carrying blades that extend radially outwards from the platform.

BACKGROUND OF THE INVENTION

In a turbomachine, the incoming air splits into two streams, a primary stream that flows in the more central region, and a secondary stream that surrounds the primary stream circumferentially. The radially-outer boundary of the primary stream, i.e. the region where the primary and secondary streams meet, forms substantially a cylinder of axis parallel to the main axis of the turbomachine. On coming into contact with the nose of the turbomachine, the central region of the primary stream flows while turning and following the wall of the nose of the turbomachine, which nose is conical in shape, flaring in the flow direction of the air as far as the inlet to a circumferential passage, where the wall of the nose becomes progressively parallel to the main axis of the turbomachine. A portion of the conical wall of the nose, upstream from the passage in the flow direction of the primary stream, is constituted by a platform referred to as the fan platform and that serves to carry blades. These blades serve to compress the air of the primary streams and to impart axial rotary motion thereto. By progressing along the cone between the blades of the fan up to the inlet to the passage, while also turning, the primary stream is also compressed radially between the wall of the cone and the secondary air stream, and its inner boundary moves away from the main axis of the turbomachine. This mechanism serves to obtain air at the inlet to the passage that is compressed and that presents energy that has been increased since it is turning relative to the main axis of the turbomachine at a mean radius (average distance from the main axis) that is greater than its initial mean radius.

The primary and secondary streams separate at the inlet to the circumferential passage surrounding the nose of the turbomachine, the primary stream penetrating into the passage while the secondary stream flows along the radially-outer surface of the annular wall defining the outside of the passage. Within the passage there are situated blades that extend radially and that enable the primary stream to be compressed further. It is desirable for the air of the primary stream penetrating into the passage to be as highly compressed as possible, so as to facilitate the compression work performed on said air by the low pressure compressor of the passage. The efficiency with which the air of the primary stream is compressed by the fan blades increases with increasing number of blades. Nevertheless, such blades are expensive. It can be advantageous to reduce the number thereof. In addition, reducing the number of blades reduces the weight of the platform, and thus its inertia. Nevertheless, in a fan platform having fewer blades, it is more difficult to compress the air that passes between the blades. This makes the work to be performed by the compressor downstream therefrom more difficult to achieve.

The present invention seeks to remedy those drawbacks, or at least to attenuate them.

OBJECT AND SUMMARY OF THE INVENTION

The invention seeks to provide a fan platform for a turbomachine that enables the air of the primary stream to be compressed as efficiently as possible for a given number of blades carried by the platform.

This object is achieved by the fact that the platform, between two adjacent blades, includes at least one rib projecting into the space between the two blades, said rib being designed to participate in compressing the air of the primary stream, and extending in the space defined between the blades within the 40% thereof that is furthest downstream in the flow direction of the primary stream.

By means of these ribs that project into the space where the primary stream flows, the air of the primary stream passing between the blades is compressed more than it would be in a configuration without ribs. Furthermore, each rib serves to attenuate the amplitude of the vortex that develops from the leading edge of each blade (i.e. the end of the blade that is furthest upstream in the flow direction of the primary stream) where the rib meets the platform. These vortices are regions of turbulence that are undesirable since they reduce the performance of the blades. A platform of the invention is thus substantially as efficient as a platform carrying a larger number of blades, but overall it is less expensive and lighter in weight since the ribs are less expensive to make than a blade and they comprise less material, taking the place of some of the blades.

Advantageously, said at least one rib extends in the space defined between the blades within the 30% furthest downstream in the flow direction of the primary stream.

This position for the rib serves to diminish the amplitude of the vortex that develops from the leading edge of a blade and that creates a region of turbulence that disturbs the flow of air between the blades.

BRIEF DESCRIPTION OF THE DRAWINGS

The invention can be well understood and its advantages appear better on reading the following detailed description of an embodiment given by way of non-limiting example. The description refers to the accompanying drawings, in which.

MORE DETAILED DESCRIPTION

Figure 1:
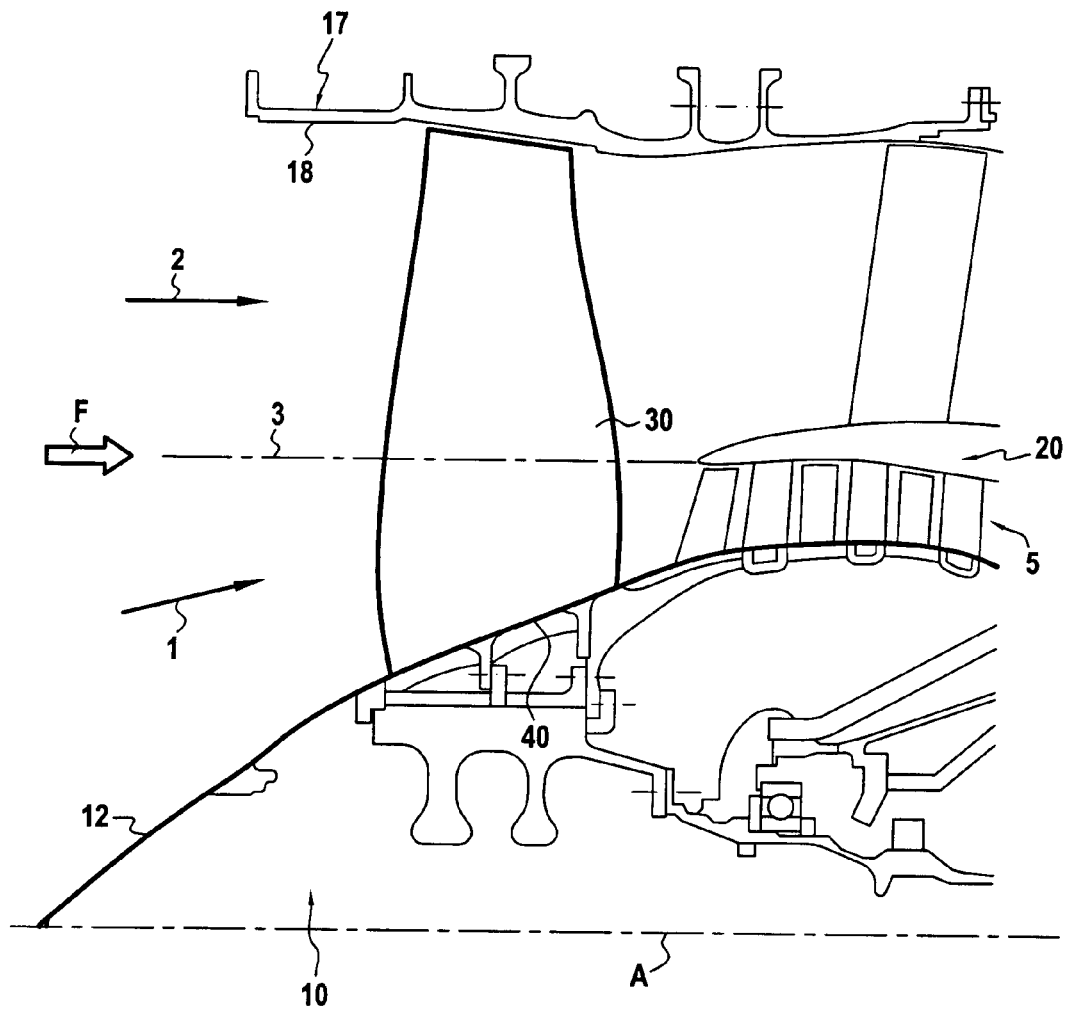
FIG. 1 is a longitudinal section of the front portion of a bypass turbomachine showing the disposition of the primary stream and of the secondary stream.

FIG. 1 shows the front portion of a bypass turbomachine of main axis A. For reasons of symmetry about the axis X, only the top half of the turbomachine is shown. In the description below, the term "front" is used to designate the portion of a part that is situated upstream relative to the stream of air passing through the turbomachine, and the term "rear" is used to designate the portion of a part that is situated further downstream in said stream of air.

The front of the turbomachine has a nose 10 with its tip pointing forwards, i.e. to the left in FIG. 1. The nose begins by flaring towards the right following substantially the shape of a cone, and then the walls of the nose become progressively parallel to the axis A so as to form substantially a cylinder of axis A. The nose 10 is surrounded by a substantially cylindrical outer casing 17 having as its axis the axis of symmetry A. The radially inner surface 18 of the outer casing 17 and the surface 12 of the nose 10 define between them an annular region in which the stream of air flows. The turbomachine advances from right to left, thus the stream of air flows between the outer casing 17 and the nose 10 from left to right in the direction of arrow F.

Set back, i.e. towards the rear, relative to the front end of the outer casing 17, there is an annular wall 20 substantially in the form of a circular cylinder about the axis of symmetry A. This annular wall 20 co-operates with the nose 10 to define an annular passage 5. The annular wall 20 splits the stream of air into a primary stream 1 that enters the passage 5, and a secondary stream 2 that surrounds the primary stream 1 circumferentially. Thus, the primary stream is defined by the nose 10 and the secondary stream, and then by the nose 10 and the annular wall 20, while the secondary stream is defined by the primary stream and by the radially-inner surface 18 of the outer casing 17, and then by the annular wall 20 and by the radially-inner surface 18 of the outer casing 17. The region of separation between the primary stream 1 and the secondary stream 2 in front of the annular wall 20 is thus substantially in the shape of a cylinder 3 having the axis A as its axis of symmetry.

As it progresses through the turbomachine, the secondary stream 2 is thus of constant section and occupies an annular volume defined by the cylinder 3 and the radially-inner surface 18 of the outer casing 17. In contrast, given that the nose 10 is conical in shape, the cross-section of the annular region through which the primary air stream 1 flows decreases as the air progresses through the turbomachine (from left to right in FIG. 1), since this region is defined outwardly by the cylinder 3 and inwardly by the surface 12 of the nose 10 which moves progressively away from the axis A in the flow direction of the air stream. The air that penetrates into the passage 5 is thus compressed.

In addition, a circumferential portion of the surface 12 of the nose 10, in front of the passage 5, is constituted by a fan platform 40 carrying blades 30. These blades 30 are distributed around the circumference of the platform 40 at regular intervals, and serves to compress and impart axial rotary motion to the air of the primary stream 1.

Figure 2:
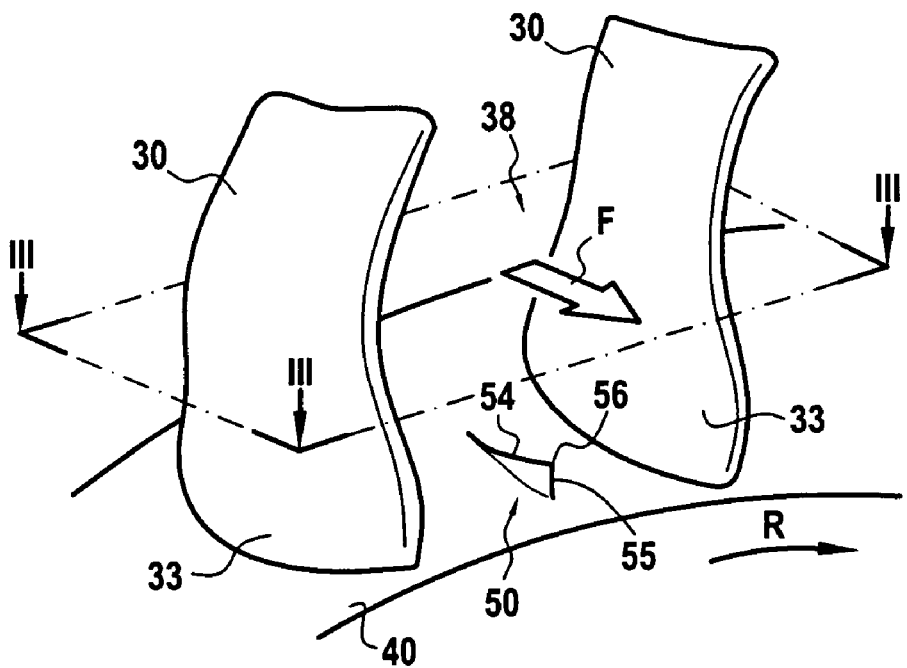
FIG. 2 is a perspective view of a platform of the invention showing two adjacent blades.
Figure 3:
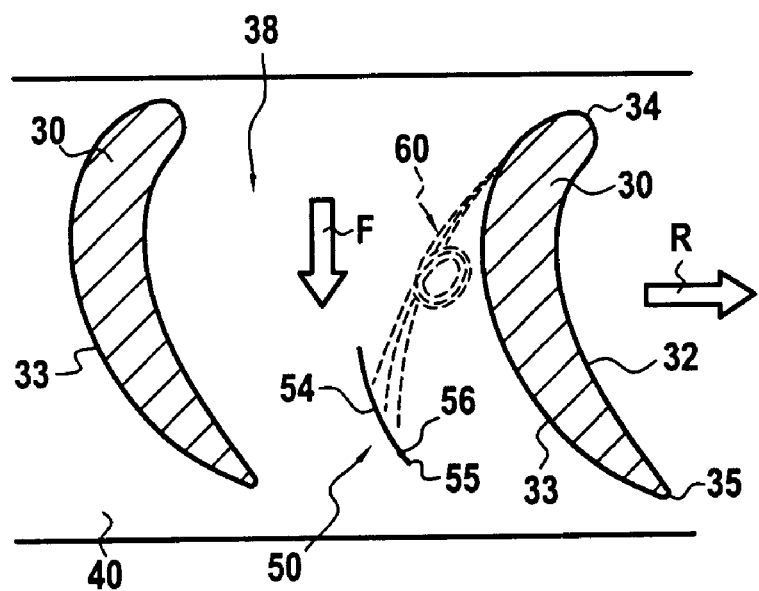
FIG. 3 is a cross-section on line III-III of FIG. 2.

As shown in FIGS. 2 and 3, the blades 30 are curved along their width (the width of a blade being its dimension substantially in the direction of the main axis A of the turbomachine) such that each blade 30 presents a concave face 32 and a convex face 33 that meets at the front at the leading edge 34 and at the rear at the trailing edge 35. The concave faces 32 of the blades 30 face in the direction of rotation of the platform 40, this direction of rotation being represented in FIGS. 2 and 3 by an arrow R, going from left to right. The arrow R is thus substantially perpendicular to the axis A. The convex face 33 of a blade 30 is situated facing the concave face 32 of the adjacent blade 30. Two adjacent blades 30 define a space 38. The primary stream flows in the space 38 from the leading edges 34 of the blades 30 towards the trailing edge 35, in the direction of arrow F, and it is compressed as it passes therethrough.

The platform 40 includes a rib 50 that extends along a line that is at substantially equal distances from two adjacent blades 30. The rib 50 possesses a leading edge 54 situated towards the front, and a trailing edge 55 situated towards the rear. The rib 50 is in the form of a fin that extends radially outwards from the platform 40, i.e. it is substantially perpendicular to the platform 40. The rib 50 may be rectilinear or it may be curved in a manner similar to the blades 30 and in the same direction. The rib 50 is smaller in height than the blades 30, or indeed much smaller. The rib 50 may be forged together with the platform 40. The rib 50 may alternatively be machined in the platform 40.

Figure 4:
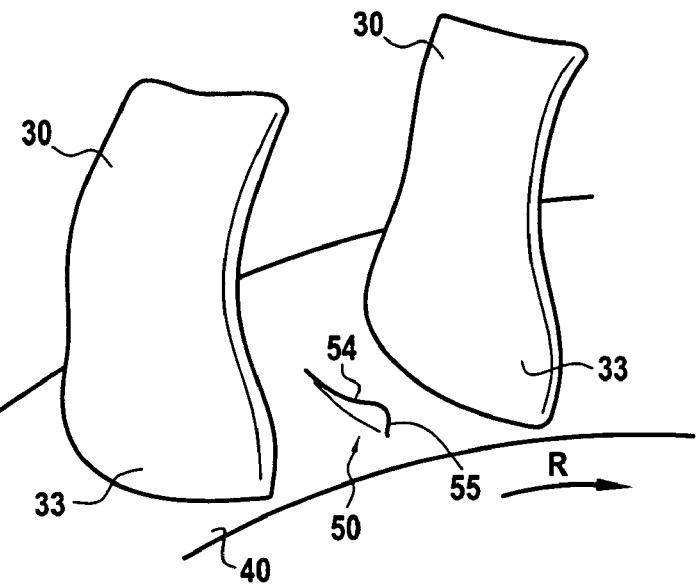
FIG. 4 shows a platform of the invention when the ribs include a rounded trailing edge.

As shown in FIG. 3, the leading edge 54 forms an angle with the platform 40 that is smaller than the angle formed by the trailing edge 55 with the platform 40, such that the tip 56 of the rib 50, i.e. the point of the rib that is furthest from the platform 40, is closer to the location where the trailing edge 55 meets the platform 40 than the location where the leading edge 54 meets the platform 40. For example, the tip 56 may be in line with the trailing edge 55 which is itself rectilinear. By way of example, the trailing edge 55 may extend radially perpendicularly to the platform 40 so that the tip 56 is situated radially over the location where the trailing edge 55 meets the platform 40. Alternatively, as shown in FIG. 4, the rib 50 may have a trailing edge 55 that is rounded.

In FIGS. 2 and 3, the rib 50 is situated in the rearmost region of the space 38, i.e. closer to the trailing edges 35 of the blades 30 than to there leading edges 34. Thus, the rib 50 is more effective at attenuating the amplitude of the vortex 60 that develops in the space 38 from the leading edge 34 of the blade 30. For example, the rib 50 is positioned in such a manner that 60% of the space 38 is situated in front of the location where the leading edge 54 meets the platform 40, and 40% of the space 38 is situated behind the location where the leading edge 54 meets the platform 40. By way of example, the rib 50 is positioned in such a manner that 70% of the space 38 is situated in front of the location where the leading edge 54 meets the platform 40, and 30% of the space 38 is situated behind the location where the leading edge 54 meets the platform 40.

Figure 5A:
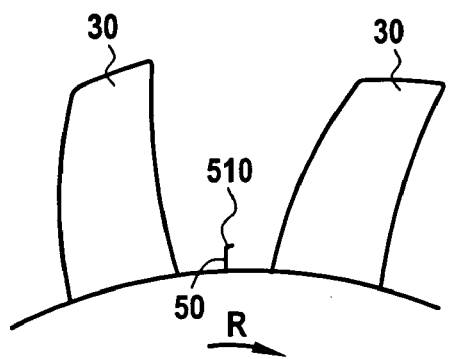
FIGS. 5A and 5B show a platform of the invention when the ribs are not rectilinear.

The rib 50 may be situated entirely in a plane that is radial relative to the axis A and perpendicular to the platform 40. The rib 50 may also have its radially-outer end 510 inclined in the direction of rotation of the platform 40, as represented by arrow R in FIG. 5A, i.e. from left to right. Thus, the radially-outer end 510 forms an angle with the radially-inner portion of the rib that is perpendicular to the platform 40, in the manner shown in FIG. 5A. The rib 50 may also include along its radial direction a plurality of successive portions that are inclined relative to one another in the direction of rotation of the platform 40.

Figure 5B:
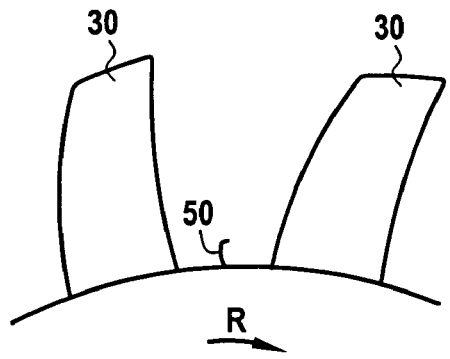

As shown in FIG. 5B, the rib 50 may also be curved over its entire radial extent in the direction of rotation of the platform 40, as represented by arrow R. Under such circumstances, the portion of the rib 50 where it meets the platform 40 may be perpendicular to the platform or it may be inclined relative to the platform 40 in the direction opposite to its direction of rotation.

Figure 6:
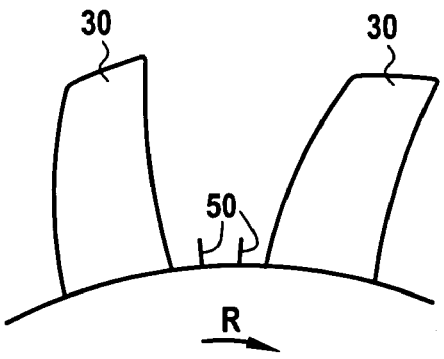
FIG. 6 shows a platform of the invention when the spaces between two adjacent blades have two ribs.

The present application is not limited to the embodiments described above. Thus, between each pair of adjacent blades 30 there may be a plurality of ribs 50. For example, the platform 40 may have two ribs 50 between adjacent pairs of blades 30, as shown in FIG. 6.

What is claimed is:

1. A fan platform for a bypass turbomachine having a primary stream and a secondary stream, said platform defining a portion of a surface of a nose about which the primary stream flows and carrying blades that extend radially outwards from said platform, the platform between two adjacent blades including at least one rib projecting into a space between the two blades, wherein said at least one rib is designed to participate in compressing the air of the primary stream, and extends in the space defined between the blades within 40% thereof that is furthest downstream in a flow direction of the primary stream such that said at least one rib is entirely located within the 40% of the downstream portion of the space, and wherein a radially-outer end of said at least one rib is inclined in a direction of rotation of said platform.

2. A fan platform according to claim 1, wherein said at least one rib extends in the space defined between the blades within 30% furthest downstream in the flow direction of the primary stream.

3. A fan platform according to claim 1, wherein said at least one rib is forged with the platform.

4. A fan platform according to claim 1, wherein said at least one rib is machined in the platform.

5. A fan platform according to claim 1, wherein a distance between a tip of said at least one rib and a location where a leading edge of said rib meets said platform is greater than a distance between said tip and a location where a trailing edge of said rib meets said platform.

6. A fan platform for a bypass turbomachine having a primary stream and a secondary stream, said platform defining a portion of a surface of a nose about which the primary stream flows and carrying blades that extend radially outwards from said platform, the platform between two adjacent blades including at least one rib projecting into a space between the two blades, wherein said at least one rib is designed to participate in compressing the air of the primary stream, and extends in the space defined between the blades within 40% thereof that is furthest downstream in a flow direction of the primary stream such that said at least one rib is entirely located within the 40% of the downstream portion of the space, wherein said at least one rib is curved over its entire radial extent in a direction of rotation of said platform.

7. A fan platform according to claim 1, having two ribs between two adjacent blades.

8. A turbomachine fan comprising blades attached to a platform according to claim 1.

9. A turbomachine provided with a fan according to claim 8.

10. A fan platform according to claim 6, wherein said at least one rib extends in the space defined between the blades within 30% furthest downstream in the flow direction of the primary stream.

11. A fan platform according to claim 6, wherein said at least one rib is forged with the platform.

12. A fan platform according to claim 6, wherein said at least one rib is machined in the platform.

13. A fan platform according to claim 6, wherein a distance between a tip of said at least one rib and a location where a leading edge of said rib meets said platform is greater than a distance between said tip and a location where a trailing edge of said rib meets said platform.

14. A fan platform according to claim 6, having two ribs between two adjacent blades.

15. A turbomachine fan comprising blades attached to a platform according to claim 6.

16. A turbomachine provided with a fan according to claim 15.

* * * * *